(12) United States Patent
Choi et al.

(10) Patent No.: US 10,266,663 B2
(45) Date of Patent: Apr. 23, 2019

(54) CONTINUOUS FIBER REINFORCED COMPOSITE AND MANUFACTURING METHOD THEREFOR

(71) Applicant: LG HAUSYS, LTD., Seoul (KR)

(72) Inventors: Jae-Hoon Choi, Anyang-si (KR); Hee-June Kim, Seongnam-si (KR); Ae-Ri Oh, Anyang-si (KR); Kang-Hyun Song, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/313,271

(22) PCT Filed: May 19, 2015

(86) PCT No.: PCT/KR2015/005007
§ 371 (c)(1),
(2) Date: Nov. 22, 2016

(87) PCT Pub. No.: WO2015/178662
PCT Pub. Date: Nov. 26, 2015

(65) Prior Publication Data
US 2017/0210866 A1    Jul. 27, 2017

(30) Foreign Application Priority Data
May 23, 2014    (KR) .................. 10-2014-0062081

(51) Int. Cl.
*C08K 3/04* (2006.01)
*C08K 3/40* (2006.01)
*C08J 5/24* (2006.01)
*C08K 7/02* (2006.01)
*C08J 5/04* (2006.01)
*C08K 3/10* (2018.01)
*C08K 7/06* (2006.01)

(52) U.S. Cl.
CPC .............. *C08J 5/24* (2013.01); *C08J 5/043* (2013.01); *C08J 5/047* (2013.01); *C08K 3/041* (2017.05); *C08K 3/10* (2013.01); *C08K 7/02* (2013.01); *C08K 7/06* (2013.01); *C08J 2323/12* (2013.01); *C08K 2201/003* (2013.01); *C08K 2201/011* (2013.01)

(58) Field of Classification Search
CPC ........ C08K 3/041; C08K 3/043; C08K 3/046; C08K 7/02; C08K 7/06; C08K 2201/003
See application file for complete search history.

(56) References Cited

U.S. PATENT DOCUMENTS

| | | | |
|---|---|---|---|
| 4,569,786 A * | 2/1986 | Deguchi ................. | C08K 7/06 252/503 |
| 4,678,699 A | 7/1987 | Kritchevsky et al. | |
| 5,137,766 A | 8/1992 | Mazanek et al. | |
| 5,141,982 A * | 8/1992 | Oku ........................ | C08K 7/06 524/432 |
| 5,512,119 A | 4/1996 | Takezawa et al. | |
| 2003/0177873 A1 | 9/2003 | Johnson | |
| 2010/0152326 A1* | 6/2010 | Kurz ...................... | C08J 3/2053 523/339 |
| 2012/0298403 A1 | 11/2012 | Johnson et al. | |
| 2013/0197122 A1* | 8/2013 | Gauchet ................ | B82Y 30/00 522/157 |

FOREIGN PATENT DOCUMENTS

| | | | |
|---|---|---|---|
| CN | 1087858 A | 6/1994 | |
| DE | 1960234 A1 | 7/1970 | |
| DE | 4443616 A1 | 6/1996 | |
| EP | 629651 A1 * | 12/1994 | |
| EP | 1375103 A1 | 1/2004 | |
| EP | 2886590 A1 | 6/2015 | |
| JP | 58215448 A * | 12/1983 | |
| JP | 01153751 A * | 6/1989 | |
| JP | H01286400 A | 11/1989 | |
| JP | 03057502 A * | 3/1991 | |
| JP | 6-114830 A | 4/1994 | |
| JP | H10195311 A | 7/1998 | |
| JP | 11330777 A * | 11/1999 | |
| JP | 2004182768 A * | 7/2004 | ............. B82Y 30/00 |

(Continued)

OTHER PUBLICATIONS

International Search Report dated Aug. 12, 2015 corresponding to International Application PCT/KR2015/005007 citing the above reference(s).
Korean Office Action dated Feb. 20, 2018 in connection with the counterpart Korean Patent Application No. 10-2014-0062081, citing the above reference(s).
European Search Report dated Apr. 5, 2017 corresponding to European Publication No. 15796772.0, citing the above reference(s).
Korean Office Action dated Mar. 14, 2017 in connection with the counterpart Korean Patent Application No. 10-2014-0062081, citing the above reference(s).

Primary Examiner — Karuna P Reddy
(74) Attorney, Agent, or Firm — Hauptman Ham, LLP

(57) ABSTRACT

Provided is a continuous fiber reinforced composite including a thermoplastic resin, fibers, and metal wires. Also provided is a method of preparing a continuous fiber reinforced composite, and the method includes impregnating fibers provided from at least one fiber creel or metal wires provided from at least one metal wire creel in a thermoplastic resin to form a melt; molding a shape of the melt by using a mold and curing the resultant by heating in a heating tube to form a primary cured product, as a primary molding process; re-molding the primary cured product by using the mold again and curing the resultant by heating in the heating tube to form a secondary cured product, as a secondary molding process; and cooling, pultruding, and cutting the secondary cured product to perform finishing of the product.

9 Claims, 2 Drawing Sheets

(56) References Cited

FOREIGN PATENT DOCUMENTS

| | | | |
|---|---|---|---|
| JP | 2007077370 A | * | 3/2007 |
| JP | 2010-189621 A | | 9/2010 |
| JP | 2012-82394 A | | 4/2012 |
| KR | 2012046556 A | * | 1/2005 |
| KR | 10-2006-0060682 A | | 6/2006 |
| KR | 10-2008-0033335 A | | 4/2008 |
| KR | 10-2009-0033440 A | | 4/2009 |
| KR | 10-2013-0124303 A | | 11/2013 |
| WO | 2014050264 A1 | | 4/2014 |

\* cited by examiner

CONTINUOUS FIBER REINFORCED COMPOSITE AND MANUFACTURING METHOD THEREFOR

CROSS REFERENCE TO RELATED APPLICATION

This application claims the priority of Korean Patent Application No. 10-2014-0062081, filed on May 23, 2014 in the KIPO (Korean Intellectual Property Office). Further, this application is the National Phase application of International Application No. PCT/KR2015/005007 filed May 19, 2015, which designates the United States and was published in Korean. Both of the priority documents are hereby incorporated by reference in their entireties.

TECHNICAL FIELD

The present invention relates to a continuous fiber reinforced composite and a method of preparing the same.

BACKGROUND ART

The industrial fields related to vehicles or construction materials that are mostly exposed to the external environment need a composite having a high level of toughness. Particularly, this is the more so as external automobile parts such as rare beams, seat backs, and under covers that are exposed to the external impact.

In this regard, since a degree to stand and resist against the force of an applied impact is the most important factor of the composite and an essential standard factor for the composite to be used as a component, the two most important factors that influence toughness of the composite are strength and elongation (a degree of extension). The two factors contradict each other, where a composite having a high strength is hard that may be easily break and thus may have a low elongation, and a relatively soft composite has a high elongation but may not have a high strength. Therefore, various studies to manufacture a composite having both high strength and excellent elongation have been conducted.

Also, a need for a composite having good functionalities such as electric conductivity, thermal conductivity, and transparency as well as good physical properties has increased.

DISCLOSURE

Technical Problem

It is an aspect of the present invention to provide a continuous fiber reinforced composite with high toughness that has high strength and elongation by including metal wires.

It is another aspect of the present invention to provide a method of preparing the continuous fiber reinforced composite.

The present invention is not limited to the above aspect and other aspects of the present invention will be clearly understood by those skilled in the art from the following description.

Technical Solution

In accordance with one aspect of the present invention, a continuous fiber reinforced composite includes a thermoplastic resin; fibers; and metal wires.

The continuous fiber reinforced composite may include 20 parts by weight or more of the fibers and less than 20 parts by weight of the metal wires based on 100 parts by weight of the thermoplastic resin.

The thermoplastic resin may be at least one selected from the group consisting of an aromatic vinyl-based resin, a rubber-modified aromatic vinyl-based resin, a polyphenylene ether-based resin, a polycarbonate-based resin, a polyester-based resin, a methacrylate-based resin, a polyarylene sulfide-based resin, a polyamide-based resin, a polyvinyl chloride-based resin, a polyolefin-based resin, and a combination thereof.

The polyolefin-based resin may be a polypropylene resin, and the polypropylene resin may be a propylene homopolymer or a ethylene-propylene polymer.

The fibers may be at least one selected from the group consisting of glass fibers, basalt fibers, carbon fibers, aramid fibers, and a combination thereof.

An average diameter of the glass fibers may range from about 5 μm to about 25 μm.

The metal wires may include Sus wires, carbon nanotube (CNT) wires, or tire cords.

An average diameter of the metal wires may range from about 50 μm to about 700 μm.

The continuous fiber reinforced composite may further include an additive.

The additive may be at least one selected from the group consisting of an antioxidant, a thermal stabilizer, a dispersant, a compatibilizer, a pigment, and a combination thereof.

In accordance with another aspect of the present invention, a method of preparing a continuous fiber reinforced composite may include impregnating fibers provided from at least one fiber creel or metal wires provided from at least one metal wire creel in a thermoplastic resin to form a melt; molding a shape of the melt by using a mold and curing the resultant by heating in a heating tube to form a primary cured product, as a primary molding process; re-molding the primary cured product by using the mold and curing the resultant by heating in the heating tube to form a secondary cured product, as a secondary molding process; and cooling, pultruding, and cutting the secondary cured product to perform finishing of the product.

Arrangements or positions of the fibers provided from the fiber creel or the metal wires provided from the metal wire creel may be controlled according to configuration of the fiber creel or the metal wire creel.

A heating temperature of the secondary molding process may be higher than a heating temperature of the primary molding process.

Advantageous Effects

As described above, according to one or more embodiments of the present invention, the continuous fiber reinforced composite may have high strength, good toughness, and excellent impact characteristics.

Since the continuous fiber reinforced composite has thermal conductivity and electric conductivity, the composite may be used in products that require electric conductivity, and productivity of the manufacturing process may improve due to the high thermal conductivity of the composite,

DESCRIPTION OF DRAWINGS

FIG. 2(a) shows a cross sectional view of a continuous fiber reinforced composite including fibers only, while FIGS. 2(b) and 2(c) show cross sectional views of continuous fiber reinforced composites including fibers and metal wires.

BEST MODE

Figure 1:
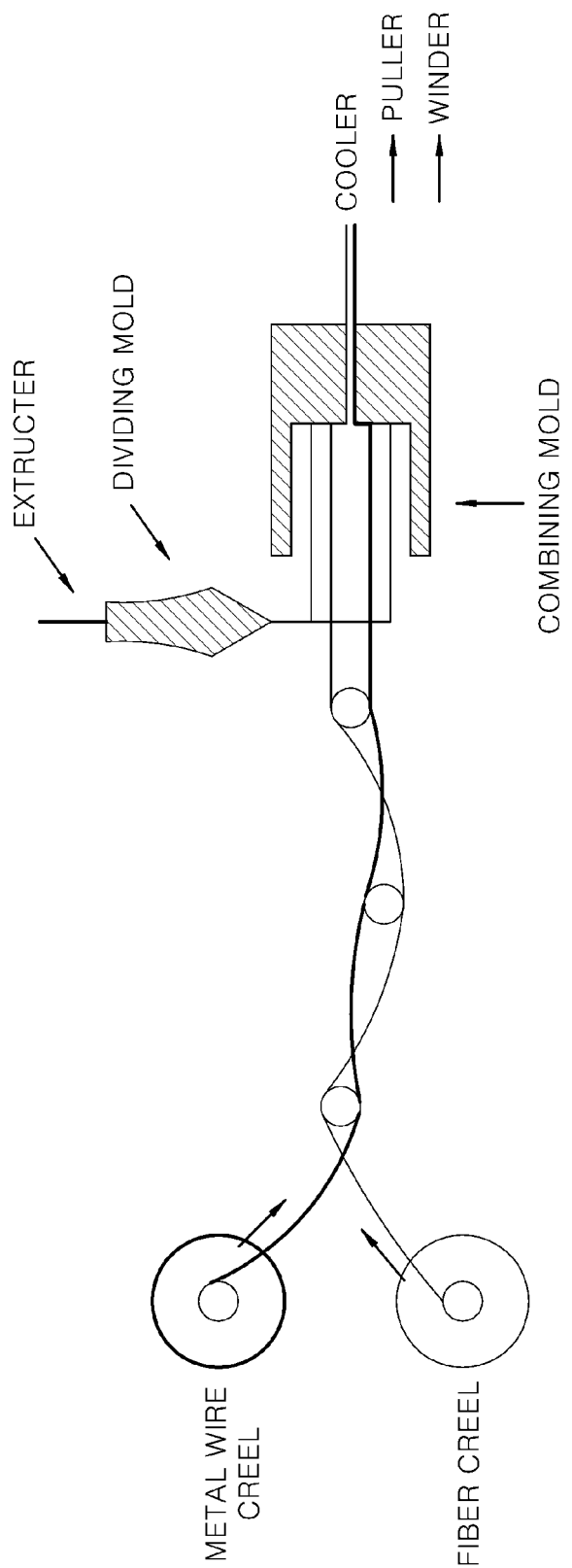
FIG. 1 is a schematic view that illustrates a method of preparing a continuous fiber reinforced composite.

Hereinafter, embodiments of the present invention will be described in detail with reference to the accompanying drawings. It should be understood that the present invention is not limited to the following embodiments, and that the embodiments are provided for illustrative purposes only. The scope of the invention should be defined only by the accompanying claims and equivalents thereof.

Continuous Fiber Reinforced Composite

According to one embodiment of the present invention, a continuous fiber reinforced composite includes a thermoplastic resin, fibers, and metal wires.

A general continuous fiber reinforced composite includes a thermoplastic resin and fibers, is prepared by using a pultrusion process, and commonly uses glass fibers or carbon fibers as a reinforcement of the thermoplastic resin. However, the continuous fiber reinforced composite may include metal wires having a high strength and a high elongation in the fibers to locally reinforce the composite, and thus a composite having improved toughness and strength with respect to impacts than the conventional composite may be manufactured. Further, the reinforced metal wires have electrical conductivity, and thus the continuous fiber reinforced composite may be used in products that require electric conductivity. Also, the continuous fiber reinforced composite has a higher thermal conductivity than that of the composite including only the thermoplastic resin and fibers, and thus when the continuous fiber reinforced composite is manufactured thick, its excellent heat transfer may result in a high productivity of the manufacturing process.

Also, compared to a composite that includes a metal plate or other metal reinforcement, the continuous fiber reinforced composite of the present invention may have impact properties caused by inherent elasticity of the metal wires and a web-type network that may be formed between the metal wires, and thus mechanical properties such as shearing strength and elongation of the continuous fiber reinforced composite may be better than those of the composite including a metal plate or other metal reinforcement.

The continuous fiber reinforced composite may include about 20 parts by weight or more of the fibers and about 20 parts by weight or less of the metal wires based on 100 parts by weight of the thermoplastic resin. For example, the fibers may be included at an amount ranging from about 30 parts by weight to about 80 parts by weight, and the metal wires may be included at an amount ranging from about 5 parts by weight to about 15 parts by weight, based on 100 parts by weight of the thermoplastic resin.

When the fibers are included at an amount less than about 20 parts by weight based on 100 parts by weight of the thermoplastic resin, physical properties as a continuous fiber reinforced composite may not be exhibited, and when the fibers are included at an amount higher than about 80 parts by weight based on 100 parts by weight of the thermoplastic resin, the amount of the fibers is too high that a process for manufacturing continuous fiber reinforced composite having a single layer and a post-process thereafter may be difficult to be performed, and thus maintaining the amount of fibers within this range is preferable in terms of securing physical properties of the continuous fiber reinforced composite and increasing efficiency of the manufacturing process.

Also, when the metal wires are included at an amount higher than about 20 parts by weight based on 100 parts by weight of the thermoplastic resin, a weight of the composite increases due to a high specific gravity of the metal wires, and thus a physical property increasing ratio with respect to weight may relatively decrease. Thus, when the amount of the metal wires is maintained within this range, the effect of increasing physical property with respect to weight may be maximized.

The thermoplastic resin may be at least one selected from the group consisting of an aromatic vinyl-based resin, a rubber-modified aromatic vinyl-based resin, a polyphenylene ether-based resin, a polycarbonate-based resin, a polyester-based resin, a methacrylate-based resin, a polyarylene sulfide-based resin, a polyamide-based resin, a polyvinyl chloride-based resin, a polyolefin-based resin, and a combination thereof. In particular, the polyolefin-based resin may be a polypropylene resin, and the polypropylene resin may be a propylene homopolymer or a ethylene-propylene polymer.

The fibers may be at least one selected from the group consisting of glass fibers, basalt fibers, carbon fibers, aramid fibers, and a combination thereof. When the thermoplastic resin includes the fibers, strength of the composite may be reinforced, and, for example, glass fibers that are surfaced treated for polyolefin may be used.

An average diameter of the glass fibers may range from about 5 µm to about 25 µm, or, for example, about 10 µm to about 20 µm. When the average diameter of the glass fibers is maintained within this range, characteristics of the fibers to be flattened and to be impregnated in the thermoplastic resin may be easily secured.

The metal wires may include Sus wires, carbon nanotube (CNT) wires, or tire cords. The thermoplastic resin may include the metal wires in addition to the fibers to further reinforce strength of the composite, and the composite may have electric conductivity and thermal conductivity due to the intrinsic properties of the metal wires.

For example, the tire cord is a reinforcement of a fiber material that is inserted in rubber increase durability, drivability, and stability, and when the tire cords are included in the composite, the composite may secure high flexural strength and elongation.

An average diameter of the metal wires may range from about 50 µm to about 700 µm, or, for example, about 300 µm to about 500 µm. When the average diameter of the metal wires is maintained within this range, the metal wires may be well impregnated in the thermoplastic resin, and the physical properties of the metal wire itself may be easily secured.

Also, since lengths of the glass fibers or the metal wires are not particularly limited. The fibers and metal wires continuously provided from the creel may be impregnated in the thermoplastic resin and cut by the desired lengths.

The continuous fiber reinforced composite may further include an additive in addition to the thermoplastic resin, fibers, and metal wires. The additive may be at least one selected from the group consisting of an antioxidant, a thermal stabilizer, a dispersant, a compatibilizer, a pigment, and a combination thereof. For example, an amount of the additive further included in the continuous fiber reinforced composite may range from about 0.5 parts by weight to about 3.0 parts by weight based on 100 parts by weight of the thermoplastic resin.

Method of Preparing Continuous Fiber Reinforced Composite

According to another embodiment of the present invention, a method of preparing a continuous fiber reinforced composite includes impregnating fibers provided from at least one fiber creel or metal wires provided from at least one metal wire creel in a thermoplastic resin to form a melt; molding a shape of the melt by using a mold and curing the resultant by heating in a heating tube to form a primary cured product, as a primary molding process; re-molding the primary cured product by using the mold and curing the resultant by heating in the heating tube to form a secondary cured product, as a secondary molding process; and cooling, pultruding, and cutting the secondary cured product to perform finishing of the product.

A general preparation method for a continuous fiber reinforced composite is pultrusion molding. In particular, fibers are provided from several tens creels, the provided fibers are widely spread by tension and speed units, and a tension force is applied to the fibers by a winder. Then, as the fibers pass a dye impregnated with a thermoplastic resin supplied from an extruder, the fibers are impregnated in the thermoplastic resin and are extracted in the same shape of the dye. Thereafter, the fibers are cooled in a cooling chamber to be cured in the shape, and a continuous fiber reinforced composite of a roll-type may be manufactured by using a rewinder.

Although the method of preparing a continuous fiber reinforced composite according to the present invention is similar to the general preparation method for a continuous fiber reinforced composite, the method according to the present invention uses metal wires instead of conventional fibers on some creels to replace a part including only fibers with that partially including metal wires. FIG. 1 is a schematic view that illustrates the method of preparing a continuous fiber reinforced composite according to the present invention.

When some fiber creels are replaced with metal wire creels, the continuous fiber reinforced composite may include metal wires in addition to a thermoplastic resin and fibers, and the composite may thus have high flexural strength and elongation due to the metal wires. Further, the composite may be used in products that require electric conductivity and thermal conductivity.

Arrangement or positions of the fibers provided from the fiber creels or the metal wires provided from the metal wire creels may be controlled according to positions of the fiber creels or the metal wire creels.

In particular, when the fiber creels or the metal wire creels are intensely arranged on a surface opposite to a surface, where impact is applied to, an impact absorbing energy of the composite may increase, and thus the composite may have excellent impact resistance.

Also, depending on arrangement of the fiber creels or the metal wire creels and the number of creels, an amount of the metal wires and the arrangement of the metal wires with the fibers in the composite may change.

For example, when the same weight of the metal wires are inserted, it is more preferable to insert a large amount of small wires rather than inserting a small amount of large wires in terms of increasing elongation and an impact absorption amount of the composite.

Figure 2A:
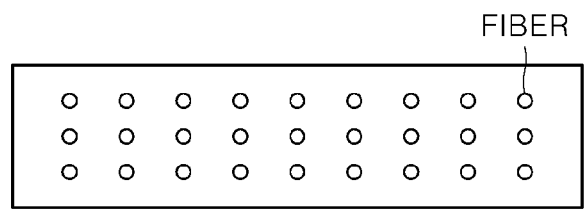
FIG. 2(a)-FIG. 2(c) show cross sectional views of continuous fiber reinforced composites according to several embodiments.
Figure 2B:
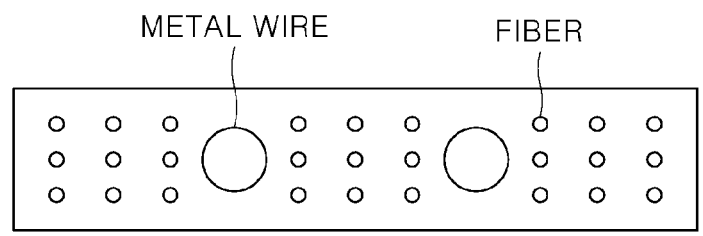
Figure 2C:
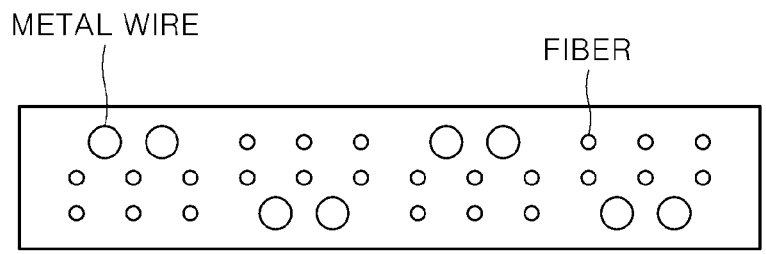

FIG. 2(a)-FIG. 2(c) show cross sectional views of continuous fiber reinforced composites according to several embodiments. FIG. 2(a) shows a cross sectional view of a continuous fiber reinforced composite including fibers only, while FIGS. 2(b) and 2(c) show cross sectional views of continuous fiber reinforced composites including fibers and metal wires.

Referring to FIG. 2(a), when the continuous fiber reinforced composite including fibers only is manufactured by pultrusion molding, positions of the fibers may be controlled according to positions of fiber creels. On the other hand, FIGS. 2(b) and 2(c) show cross-sectional views of continuous fiber reinforced composites including fibers and metal wires, where arrangement and positions of metal wires may vary depending on how fiber creels are replaced with metal wire creels. For example, the metal wire creels may be arranged according to a content ratio and positions of the metal wires, and thus the continuous fiber reinforced composite having the desired type and physical properties may be manufactured.

A heating temperature of the secondary molding process may be higher than a heating temperature of the primary molding process. In particular, the heating temperature of the secondary molding process may range from about 200° C. to about 230° C., and the heating temperature of the primary molding process may range from about 180° C. to about 200° C. In order to control contents of fibers and metal wires and a thickness of the continuous fiber reinforced composite thus prepared, the heating temperature of the secondary molding process may be maintained higher than the heating temperature of the primary molding process. Also, the cured product may be cooled at a temperature ranging from about 20° C. to about 80° C.

Hereinafter, the present invention will be described in detail by referring to examples, but these examples are provided for illustrative purposes only and not intended to limit the scope of the present invention.

EXAMPLES AND COMPARATIVE EXAMPLES

Example 1

Glass fibers having a diameter of 16 μm provided from at least one fiber creel and Sus wires having a diameter of 500 μm provided from at least one metal wire creel were impregnated in a polypropylene resin to form a melt, and the melt was primarily cured at a temperature of 190° C., secondarily cured at a temperature of 220° C., cooled at a temperature of 40° C., and cut to prepare a continuous fiber reinforced composite including 60 parts by weight of the glass fibers and 5 parts by weight of the Sus wires based on 100 parts by weight of the polypropylene resin.

Example 2

Carbon fibers having a diameter of 20 μm provided from at least one fiber creel and carbon nanotube (CNT) wires having a diameter of 300 μm provided from at least one metal wire creel were impregnated in a polypropylene resin to form a melt, and the melt was primarily cured at a temperature of 180° C., secondarily cured at a temperature of 200° C., cooled at a temperature of 50° C., and cut to prepare a continuous fiber reinforced composite including 30 parts by weight of the carbon fibers and 30 parts by weight of the CNT wires based on 100 parts by weight of the polypropylene resin.

Comparative Example 1

A continuous fiber reinforced composite was prepared the same as in Example 1, except that Sus wires were not provided by the metal wire creel so that the composite did not include the Sus wires.

Comparative Example 2

A continuous fiber reinforced composite was prepared the same as in Example 2, except that CNT wires were not provided by the metal wire creel so that the composite did not include the CNT wires.

<Experimental Example>—Physical Characteristics of Continuous Fiber Reinforced Composite 1) Flexural strength and fracture elongation: The composites of Examples 1 and 2 and Comparative Examples 1 and 2 were each placed in a bending tester, the composite was fixed to a lower 2-axis by using a 3-axis jig, and the bending test was performed as a 1-axis in the center connected to a load cell 5 kN came down under the load. Here, a curve having a horizontal axis representing strain (%) values and a vertical axis representing stress (MPa) was obtained, where this was used as the fracture elongation, and the maximum force at fracture (70% decreased from the maximum stress) was measured as the flexural strength.

2) Impact absorption energy: The total area of the stress-strain curve obtained according to ASTM D790 was calculated to measure the impact absorption energy.

TABLE 1

|  | Example 1 | Example 2 | Comparative Example 1 | Comparative Example 2 |
|---|---|---|---|---|
| Flexural strength (kgf/mm$^2$) | 528 | 1220 | 503 | 1180 |
| Fracture elongation (%) | 3.72 | 2.65 | 2.20 | 1.70 |
| Impact absorption energy (J) | 1.85 | 2.98 | 0.95 | 1.72 |

Referring to Table 1, the flexural strengths, fracture elongations, and impact absorption energies of the composites prepared in Examples 1 and 2 were measured higher than those of the composites prepared in Comparative Examples 1 and 2 that did not include metal wires.

In particular, it could be seen that the composite including Sus wires as prepared in Example 1 and the composite including CNT wires as prepared in Example 2 had improved strength and impact performance compared to those of the composite not including Sus wires as prepared in Comparative Example 1 and the composite not including CNT wires as prepared in Comparative Example 2, respectively.

The invention claimed is:

1. A continuous fiber reinforced composite comprising:
a thermoplastic resin;
fibers; and
wires,
wherein the fibers are at least one selected from the group consisting of glass fibers, basalt fibers, carbon fibers and aramid fibers, and are present in an amount ranging from 30 parts by weight to 80 parts by weight based on 100 parts by weight of the thermoplastic resin, and
wherein the wires comprise carbon nanotube (CNT) wires, tire cords or combination thereof, and have an average diameter ranging from 300 μm to 500 μm.

2. The continuous fiber reinforced composite of claim 1 comprising less than 20 parts by weight of the wires based on 100 parts by weight of the thermoplastic resin.

3. The continuous fiber reinforced composite of claim 1, wherein the thermoplastic resin is at least one selected from the group consisting of an aromatic vinyl-based resin, a rubber-modified aromatic vinyl-based resin, a polyphenylene ether-based resin, a polycarbonate-based resin, a polyester-based resin, a methacrylate-based resin, a polyarylene sulfide-based resin, a polyamide-based resin, a polyvinyl chloride-based resin, a polyolefin-based resin, and a combination thereof.

4. The continuous fiber reinforced composite of claim 3, wherein the polyolefin-based resin is a polypropylene resin, and the polypropylene resin is a propylene homopolymer or an ethylene-propylene polymer.

5. The continuous fiber reinforced composite of claim 1, wherein an average diameter of the glass fibers ranges from about 5 μm to about 25 μm.

6. The continuous fiber reinforced composite of claim 1 further comprising an additive.

7. The continuous fiber reinforced composite of claim 6, wherein the additive is at least one selected from the group consisting of an antioxidant, a thermal stabilizer, a dispersant, a compatibilizer, a pigment, and a combination thereof.

8. A method of preparing a continuous fiber reinforced composite, the method comprising:
impregnating fibers provided from at least one fiber creel and wires provided from at least one wire creel in a thermoplastic resin to form a melt;
molding a shape of the melt by using a mold and curing the resultant by heating in a heating tube to form a primary cured product, as a primary molding process;
re-molding the primary cured product by using the mold and curing the resultant by heating in the heating tube to form a secondary cured product, as a secondary molding process; and
cooling, pultruding, and cutting the secondary cured product to perform finishing of the product wherein the fibers are at least one selected from the group consisting of glass fibers, basalt fibers, carbon fibers, and aramid fibers, and are present in an amount ranging from 30 parts by weight to 80 parts by weight based on 100 parts by weight of the thermoplastic resin, and
wherein the wires comprise carbon nanotube (CNT) wires, tire cords or combination thereof, and have an average diameter ranging from 300 μm to 500 μm.

9. The method of claim 8, wherein a heating temperature of the secondary molding process is higher than a heating temperature of the primary molding process.

* * * * *